(12) United States Patent
Aoi

(10) Patent No.: US 9,291,518 B2
(45) Date of Patent: Mar. 22, 2016

(54) KNOCKING SENSOR

(71) Applicant: NGK SPARK PLUG CO., LTD., Nagoya-shi, Aichi (JP)

(72) Inventor: Katsuki Aoi, Kani (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 245 days.

(21) Appl. No.: 14/032,292

(22) Filed: Sep. 20, 2013

(65) Prior Publication Data

US 2014/0081553 A1  Mar. 20, 2014

(30) Foreign Application Priority Data

Sep. 20, 2012 (JP) ................ 2012-206912
May 21, 2013 (JP) ................ 2013-106836
Aug. 19, 2013 (JP) ................ 2013-169407

(51) Int. Cl.
*F02P 3/12* (2006.01)
*G01L 23/22* (2006.01)
*F02P 5/152* (2006.01)

(52) U.S. Cl.
CPC .............. *G01L 23/222* (2013.01); *F02P 5/152* (2013.01)

(58) Field of Classification Search
CPC .......... G01L 23/222; F02P 5/152; F02P 3/12
USPC ........................ 123/616; 73/35.07
See application file for complete search history.

(56) References Cited

U.S. PATENT DOCUMENTS

| | | | |
|---|---|---|---|
| 5,798,453 A * | 8/1998 | Brammer et al. | 73/35.09 |
| 6,212,940 B1 | 4/2001 | Castaing et al. | |
| 6,779,381 B2 * | 8/2004 | Subramanian et al. | 73/35.07 |
| 6,923,041 B2 * | 8/2005 | Harada et al. | 73/35.07 |
| 7,100,426 B2 * | 9/2006 | Aoi et al. | 73/35.07 |

(Continued)

FOREIGN PATENT DOCUMENTS

| | | |
|---|---|---|
| CN | 1147087 A | 4/1997 |
| CN | 1755340 A | 4/2006 |
| JP | 2000-509508 A | 7/2000 |
| JP | 2005-249601 A | 9/2005 |
| JP | 2010-101696 A | 5/2010 |
| JP | 2012-47686 A | 3/2012 |

OTHER PUBLICATIONS

Communication dated Apr. 20, 2015 issued by Japanese Intellectual Property Office in counterpart Japanese Patent Application No. 2013-169407.

(Continued)

*Primary Examiner* — Hai Huynh
(74) *Attorney, Agent, or Firm* — Sughrue Mion, PLLC

(57) ABSTRACT

In a knocking sensor, including: a metal shell having a cylindrical portion, and a flange portion that is located on the cylindrical portion, and projected toward an outside of the cylindrical portion in a circumferential direction, an annular weight that is fitted onto an outer circumference of the cylindrical portion, and has an upper surface, an annular piezoelectric element that is fitted onto an outer circumference of the cylindrical portion, and interposed between the flange portion and the weight, and an insulating body that is interposed between the flange portion and the piezoelectric element, a protruding portion that is protruded while being plastically deformed from an inner surface of the cylindrical portion outward in a circumferential direction, and locks the weight in contact with the upper surface of the weight directly or through a member is disposed on an outer circumferential surface of the cylindrical portion.

10 Claims, 7 Drawing Sheets

(56) References Cited

U.S. PATENT DOCUMENTS

| | | |
|---|---|---|
| 7,178,383 B2 * | 2/2007 | Shibata et al. ............... 73/35.11 |
| 7,207,207 B2 * | 4/2007 | Shibata et al. ............... 73/35.11 |
| 2003/0005911 A1 | 1/2003 | Subramanian et al. |
| 2006/0065042 A1 | 3/2006 | Shibata et al. |
| 2014/0076028 A1 * | 3/2014 | Kuno et al. ................. 73/35.07 |

OTHER PUBLICATIONS

Communication from the State Intellectual Property Office of P.R. China dated Oct. 23, 2015 in Chinese application no. 201310430819.7.

* cited by examiner

KNOCKING SENSOR

BACKGROUND

The present invention relates to a knocking sensor using a piezoelectric element.

There has been known a knocking sensor that detects a knocking phenomenon in an internal combustion engine of an automobile or the like, and a retard control of an ignition timing of an ignition plug is conducted according to the detection of the knocking sensor.

As the above-mentioned knocking sensor, there has been known a knocking sensor of a so-called sensor hole non-resonant type having an installation hole for installation to a cylinder block of the internal combustion engine in a center portion thereof. The knocking sensor includes a metal shell having a cylindrical portion and a flange portion located on one end of the cylindrical portion, and is configured so that an annular insulating member, a piezoelectric element, a weight, and a nut are fitted into an outer periphery of the cylindrical portion in order from the flange portion side. Then, an external thread portion of an outer peripheral surface of the cylindrical portion is screwed into the nut to lock the weight, and the piezoelectric element is fixedly interposed between the flange and the weight. Further, an overall inner part into which the insulating member, the piezoelectric element, and the weight are incorporated into the metal shell is coated with a resin to configure the knocking sensor. An inner surface of the cylindrical portion forms the installation hole. See for example, JP-A-2010-101696.

SUMMARY

However, in the related-art knocking sensor, because the weight is locked to the metal shell with the use of the nut as described above, metal powder is generated when screwing the nut, and attached to a periphery of the piezoelectric element, resulting in a risk that an insulating property is lessened between the piezoelectric element and metal shell. There arises such a problem that the part costs of the nut are expensive.

Under the circumstance, an object of the present invention is to provide a knocking sensor that prevents the generation of the metal powder during a manufacturing process to ensure the insulating property of the piezoelectric element, and also reduces the costs.

The present invention provides the following arrangements:

(1) A knocking sensor, comprising:

a metal shell having a cylindrical portion, and a flange portion that is located on one end side of the cylindrical portion and projected toward an outside of the cylindrical portion in a circumferential direction;

an annular weight that is fitted onto an outer circumference of the cylindrical portion, and has an upper surface on an opposite side of a side facing the flange portion;

an annular piezoelectric element that is fitted onto the outer circumference of the cylindrical portion, and interposed between the flange portion and the weight; and an insulating body that is interposed between the flange portion and the piezoelectric element, wherein a protruding portion that is protruded while being plastically deformed from an inner surface of the cylindrical portion outward in a circumferential direction, and contacts the upper surface of the weight to lock the weight is disposed on an outer circumferential surface of the cylindrical portion.

(2) The knocking sensor according to (1), wherein a plating layer is disposed on the outer circumferential surface of the cylindrical portion.

(3) The knocking sensor according to (1) or (2), wherein no thread portion is formed on the outer circumferential surface of the cylindrical portion.

(4) The knocking sensor according to any one of (1) to (3), wherein a shape of a cross-section of the protruding portion taken along an axial direction thereof is formed into a convex curved surface which is curved to be projected toward an outside thereof in a circumferential direction, and smoothly connected.

(5) The knocking sensor according to any one of (1) to (4), wherein the protruding portion is divided into three or more pieces in the circumferential direction thereof.

(6) The knocking sensor according to (1), wherein the protruding portion directly contacts the upper surface of the weight.

(7) The knocking sensor according to (1), wherein a member is interposed between the protruding portion and the upper surface of the weight.

(8) The knocking sensor according to (7), wherein the member is a disc spring, a distance between a corner portion of an inner circumferential surface of the disc spring at a side of the protruding portion and the outer circumferential surface of the cylindrical portion is equal to or smaller than a distance between a corner portion of the inner circumferential surface of the disc spring at a side of the flange portion and the outer circumferential surface of the cylindrical portion.

According to the knocking sensor, the weight is locked to the metal shell by the protruding portion formed by the plastic deformation of the cylindrical portion per se, without the use of the nut. With this configuration, there is no need to rotate the nut with respect to the cylindrical portion of the metal shell in locking the weight to the metal shell, and the generation of the metal powder in screwing the nut is prevented to enable the insulating property between the piezoelectric element and the metal shell to be excellently ensured. There can be provided the knocking sensor that can reduce the part costs of the nut, reduce the costs, and is expensive.

When the outer circumferential surface of the cylindrical portion is directly processed, there is a risk that the metal powder is generated, and the metal powder is attached to the peripheral of the piezoelectric element to degrade the insulating property of the piezoelectric element. However, when an inner surface of the cylindrical portion is processed, even if the metal powder is generated, the metal powder drops off from an inner surface of the cylindrical portion toward a sensor external portion, as a result of which a drawback that the metal powder is attached to the piezoelectric element can be prevented.

According to this knocking sensor, the outer circumferential surface of the cylindrical portion is protected with the plating layer to improve an anti-rust property. Then, the processing is conducted from an inner surface of the cylindrical portion which is an opposite surface of the plating layer to reduce an impact on the plating layer as compared with a case in which the plating layer is processed directly from the outside of the cylindrical portion. As a result, the plating layer can be prevented from being peeled off to degrade the anti-rust function, and the peeled plating layer can be prevented from being attached to the piezoelectric element together with the metal powder to degrade the insulating property.

According to this knocking sensor, because of the provision of a configuration in which the weight is locked to the metal shell by the protruding portion formed by the plastic deformation of the cylindrical portion per se, the screwing per se of the metal shell into the nut becomes unnecessary. As a result, there is no need to provide the thread portion on the outer circumferential surface of the cylindrical portion, the manufacturing costs are further reduced, and the knocking sensor can be more expensively provided.

According to this knocking sensor, since a corner portion is not formed in the protruding portion, a resin mold material of which a case of the knocking sensor is made surely flows onto a surface of the protruding portion, and a throwing power of the resin to the protruding portion is improved. When the plating layer is disposed on the outer circumferential surface of the cylindrical portion, the corner portion is not generated in the protruding portion, to thereby make it hard to peel off the plating layer from the protruding portion.

According to this knocking sensor, cuts are formed between the respective protruding portions in the circumferential direction, and the resin mold material of which the case of the knocking sensor is made flows into the axial direction through the cuts. As a result, the throwing power of the resin to the protruding portion is improved.

Because the corner portion of the disc spring at the protruding portion side comes in contact with the protruding portion, this corner portion is brought closer to the outer circumferential surface of the cylindrical portion with the results that the amount of protrusion of the protruding portion outward in a radial direction is reduced as much, the disc spring can be surely brought into the protruding portion, and the protruding portion can be also easily processed. Further, with the provision of the above configuration, even if a dimensional precision of an inner diameter of the disc spring is not rigidly managed, the disc spring can be surely brought into contact with the protruding portion. As a result, the productivity of the disc spring is improved, and the management of the production of the knocking sensor is also facilitated.

DESCRIPTION OF EXEMPLARY EMBODIMENTS

Hereinafter, a knocking sensor according to an embodiment of the present invention will be described with reference to FIGS. 1 to 3.

Figure 1:
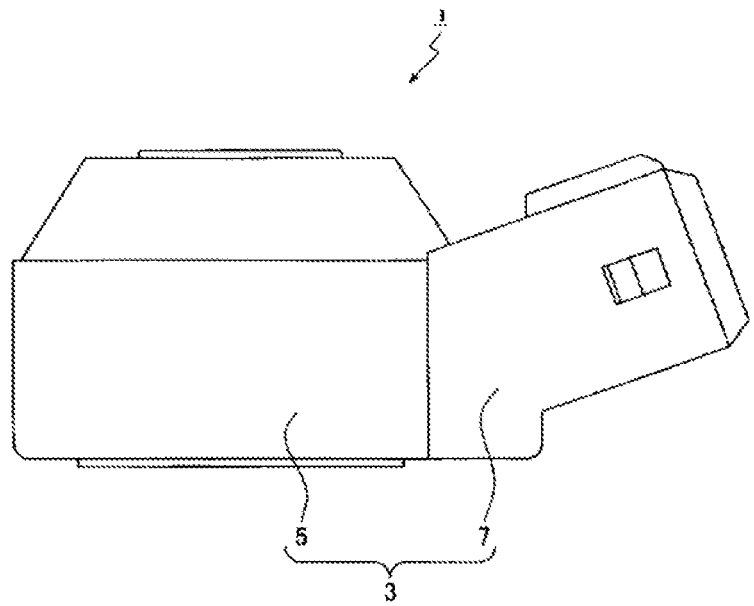
FIG. 1 is a front view illustrating an outer appearance of a knocking sensor according to an embodiment of the present invention.
Figure 2:
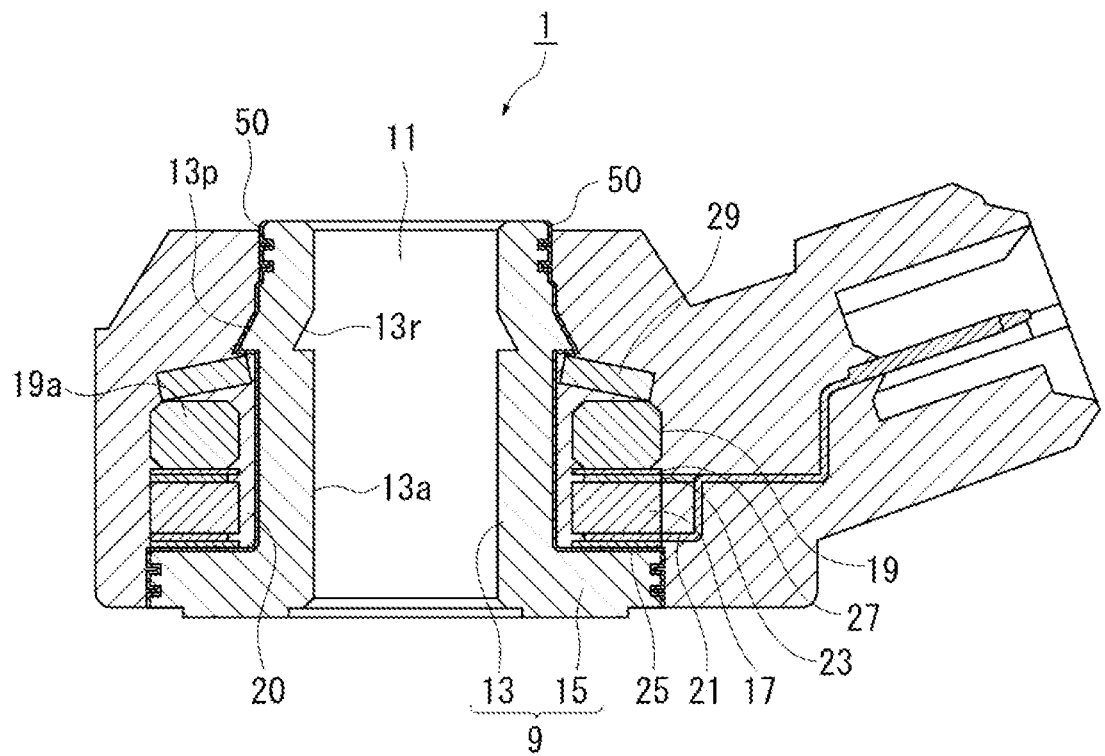
FIG. 2 is a cross-sectional view illustrating the knocking sensor according to the embodiment of the present invention.
Figure 3:
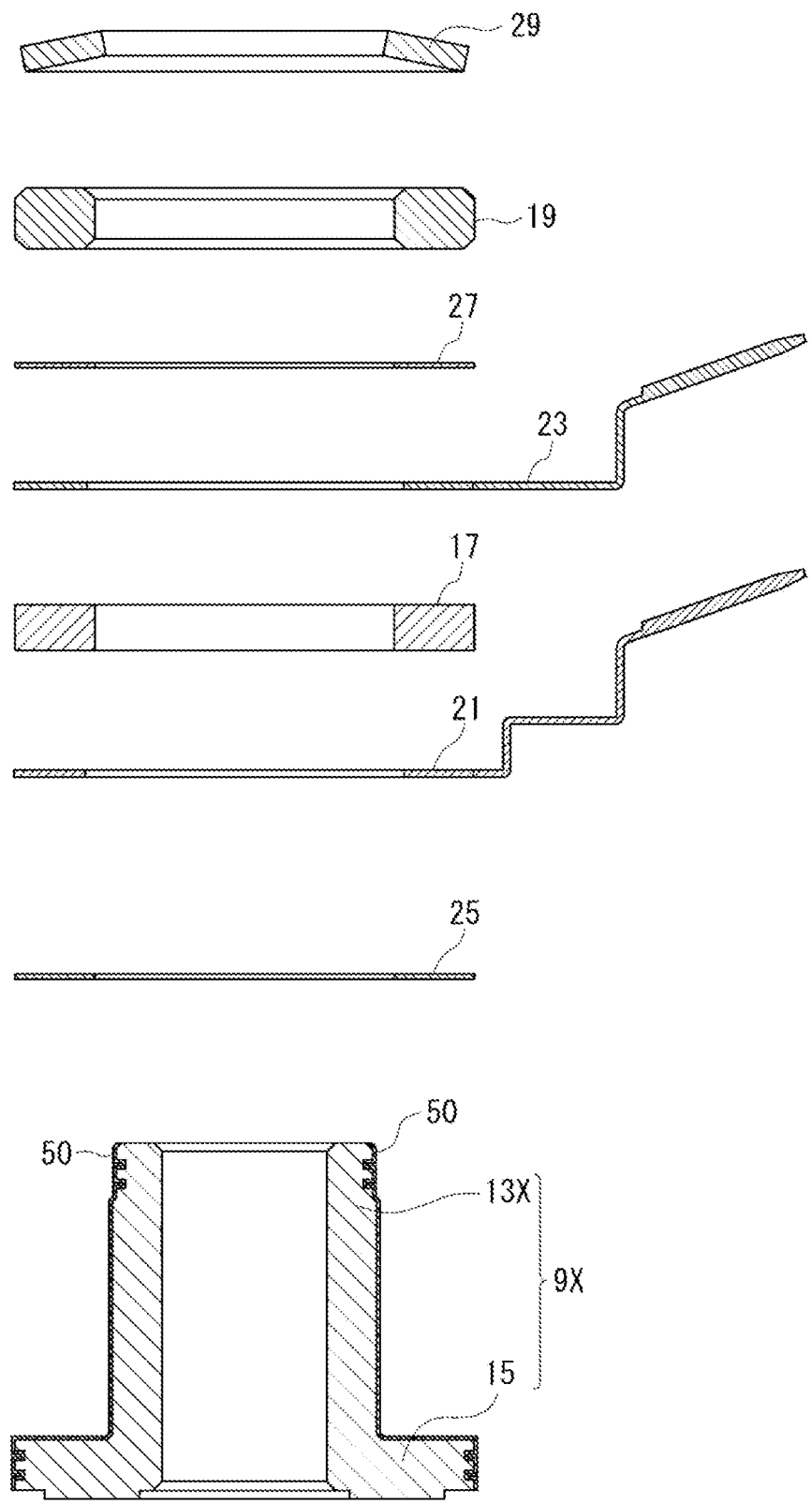
FIG. 3 is an exploded view illustrating an internal structure of the knocking sensor according to the embodiment of the present invention.

FIG. 1 illustrates an outer appearance of a knocking sensor according to an embodiment of the present invention, FIG. 2 illustrates a cross-sectional view of the knocking sensor taken along an axial direction, and FIG. 3 illustrates an exploded view of an internal structure of the knocking sensor.

Referring to FIG. 1, a knocking sensor 1 is a knocking sensor of a so-called center hole non-resonant type, having an installation hole 11 (refer to FIG. 2) for installation to a cylinder block or the like of an internal combustion engine in a center portion thereof. The knocking sensor 1 is covered with a case 3 made of a synthetic resin (for example, nylon 66) which is a resin mold material. The case 3 includes an element housing unit 5 of a columnar shape having an upper portion molded into a tapered shape, and a connection portion 7 connected to a connector from an ignition timing control device not shown.

As illustrated in FIGS. 2 and 3, the knocking sensor 1 includes a metal shell 9 made of a metal material (for example, SPHD, SWCH25K), and the metal shell 9 includes a cylindrical portion 13 of a cylindrical shape having the installation hole 11 for inserting a bolt therethrough, and a flange portion 15 that is protruded from an outer circumferential surface outward in a circumferential direction on one end side (lower side of FIG. 1) of the cylindrical portion 13. Furthermore, an outer periphery of the metal shell 9 (including the outer circumferential surface of the cylindrical portion 13) is provided with a plating layer 50 made of zinc plating for anti-rust, and a surface of the plating layer 50 is formed with a chromate layer (not shown) for the purpose of preventing corrosion of the plating layer 50.

On an overall surface (upper surface of FIG. 1) side of the metal shell 9 in a thickness direction of the flange portion 15 is mounted a piezoelectric element 17 having an annular shape (cylindrical shape) fitted onto an outer circumference of the cylindrical portion 13, and made of a piezoelectric ceramics (for example, PZT).

On an upper surface side of the piezoelectric element 17 is mounted a weight 19 having an annular shape (cylindrical shape) which is fitted onto the outer circumference of the cylindrical portion 13, and made of a metal material (for example, SMF4050) having a specific gravity that exerts an effect as a weight.

Output terminals 21 and 23 made of an electrically conductive material (for example, brass) are arranged between the flange portion 15 and the piezoelectric element 17, and between the weight 19 and the piezoelectric element 17, that is, on both sides of the piezoelectric element 17 in the thickness direction so as to come in contact with the piezoelectric element 17. Portions of the output terminals 21 and 23, which come in contact with the piezoelectric element 17, are annular.

Annular insulating bodies 25 and 27 made of a synthetic resin (for example, PET) having an insulating property and shaped into a film are arranged between the flange portion 15 and the output terminal 21, and between the output terminal 23 and the weight 19, respectively, so that the output terminals 21 and 23 are prevented from being short-circuited with the flange portion 15 and the weight 19 of the metal shell 9.

An annular space 20 is formed between inner circumferential surfaces of the piezoelectric element 17, the weight 19, the output terminals 21, 23 (annular portions), and the insulating bodies 25, 27, and the outer circumferential surface of the cylindrical portion 13, and the annular space 20 is filled with the above synthetic resin. Further, the metal shell 9 is equipped with an annular disc spring 29 which is made of a metal material (for example, SK-5M), and presses the weight 19 toward a direction of the flange portion 15 (downward in the figure).

At least a part of a lower surface of the disc spring 29 comes in contact with an upper surface (upper surface in FIG. 1) 19a of the weight 19, and the upper surface 19a of the weight 19 corresponds to "upper surface". The disc spring 29 corresponds to "member". Further, the insulating body between the flange portion 15 and the output terminal 21 corresponds to "insulating body".

Further, at a position of an upper side of the disc spring 29, the outer circumferential surface of the cylindrical portion 13 is provided with a protruding portion 13p that is plastically deformed and protruded from an inner surface 13a of the cylindrical portion 13 outward in the circumferential direction. The inner surface 13a of the cylindrical portion 13 corresponding to the protruding portion 13p is formed with a concave portion 13r.

Then, the protruding portion 13p is brought in contact with the upper surface of the disc spring 29 to press the disc spring 29 downward, and the weight 19 is locked by an elastic force of the disc spring 29 so that a laminate structure (the piezoelectric element 17, the output terminals 21, 23, and the insulating bodies 25, 27) between the weight 19 and the flange portion 15 is fixed to the metal shell 9.

That is, in this embodiment, the protruding portion 13p comes in contact with the upper surface 19a of the weight 19 through the disc spring 29, and the weight 19 is pressed toward the flange portion 15 of the metal shell 9 so that the weight 19 is indirectly locked to the metal shell 9.

The protruding portion 13p needs to be protruded from the outer circumferential surface of the cylindrical portion 13 by about 1 to 0.2 mm.

As described above, the weight 19 is locked to the metal shell 9 with the protruding portion 13p provided in the cylindrical portion 13 without the use of the nut, as a result of which the metal powder is prevented from being generated in screwing the nut, and the insulating property between the piezoelectric element 17 and the metal shell 9 can be excellently ensured. The part costs of the nut is reduced, the costs of the knocking sensor 1 can be reduced.

The outer circumferential surface of the cylindrical portion 13 is directly processed without the use of the nut to form the protruding portion whereby the weight 19 can be locked to the metal shell 9. However, in this case, when the outer circumferential surface of the cylindrical portion 13 is processed, the metal powder may be still generated, and the metal powder may be attached to the periphery of the piezoelectric element 17 so that the insulating property between the piezoelectric element 17 and the metal shell 9 is degraded. When the plating layer 50 is formed on the outer circumferential surface of the metal shell 9, if the outer circumferential surface of the cylindrical portion 13 is directly processed, the plating layer 50 may be peeled off to degrade the anti-rust function, and the peeled plating layer 50 may be attached to the periphery of the piezoelectric element 17 to degrade the insulating property.

From the above fact, when the processing (plastic deformation) is conducted from the inner surface 13a of the cylindrical portion 13 outward in the circumferential direction, even if the metal powder is generated, the metal powder drops off from the installation hole 11 from the external, as a result of which a drawback that the metal powder is attached to the piezoelectric element 17 can be prevented. When the processing is conducted from the inner surface 13a of the cylindrical portion 13 which is an opposite surface of the plating layer 50, an impact on the plating layer 50 is reduced as compared with a case in which the plating layer 50 is processed directly from the outside of the cylindrical portion 13. As a result, the plating layer 50 can be prevented from being peeled off.

Then, an example of a method of manufacturing the knocking sensor 1 according to this embodiment will be described with reference to FIGS. 4 and 5.

Figure 4A:
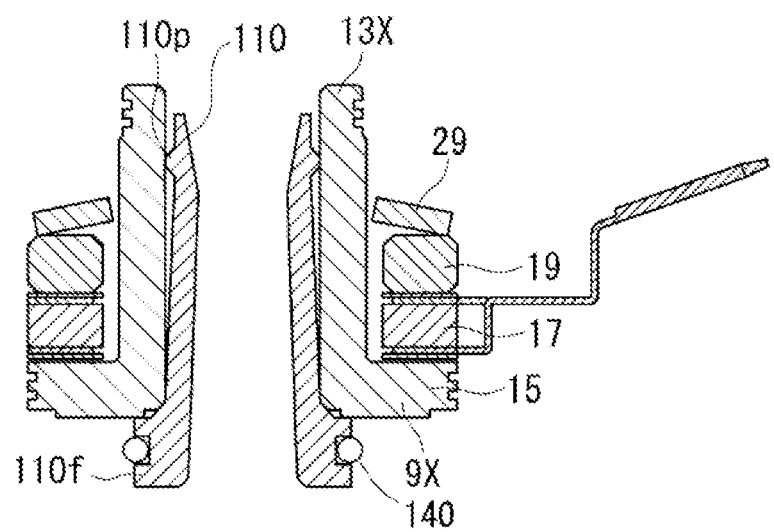
FIGS. 4A to 4D show a process chart illustrating an example of a method of manufacturing the knocking sensor according to the embodiment of the present invention.

First, a metal shell raw blank 9x is prepared. The metal shell raw blank 9x includes a cylindrical portion 13x in which the concave portion 13r is not formed in the inner surface 13a, and a protruding portion 13p is not formed on the outer circumferential surface, and the above-mentioned flange portion 15 on one end side (lower side) of the cylindrical portion 13x (refer to FIG. 3). Then, the insulating body 25, the output terminal 21, the piezoelectric element 17, the output terminal 23, the insulating member 27, the weight 19, and the disc spring 29 are sequentially mounted on the flange portion 15 so as to be fitted onto the outer circumferential side of the cylindrical portion 13x. Further, a press jig 110 is inserted into an inner surface of the cylindrical portion 13x from the flange portion 15 side (lower side) (FIG. 4A). The press jig 110 is configured by pieces divided into four parts by four notch portions 110s which will be described later, and formed of an assembly in which protruding portions 110f located on the lower end side of the respective pieces are held by one annular holding ring 140, and has a substantially cylindrical shape having an substantially circular hole into which a piston 130 which will be described later can be inserted inside. The protruding portions 110f of the respective pieces configuring the press jig 110 are abutted against the lower surface of the flange portion 15 to position an insertion depth.

Figure 5:
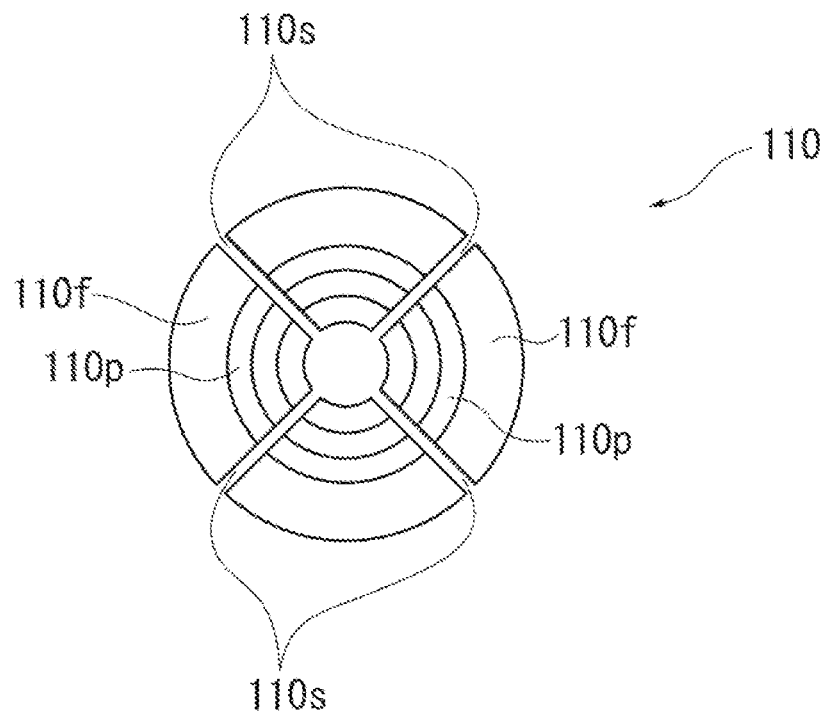
FIG. 5 is a top view of a press jig used in a manufacture of the knocking sensor according to the embodiment of the present invention.

As illustrated in FIG. 5, an upper end side of the press jig 110 (the respective pieces) are formed with a convex portion 110p protruded outward in the circumferential direction, and the four notch portions 110s extended in the axial direction, and the convex portion 110p is divided into four pieces in the circumferential direction by the notch portions 110s. Accordingly, the notch portions 110s are closed or opened whereby the convex portion 110p can be reduced or enlarged in diameter in the circumferential direction, and when the press jig 110 is inserted into the inner surface of the cylindrical portion 13x, the convex portion 110p is pressed by the inner surface of the cylindrical portion 13x, and the convex portion 110p is reduced in diameter in the circumferential direction.

Figure 4B:
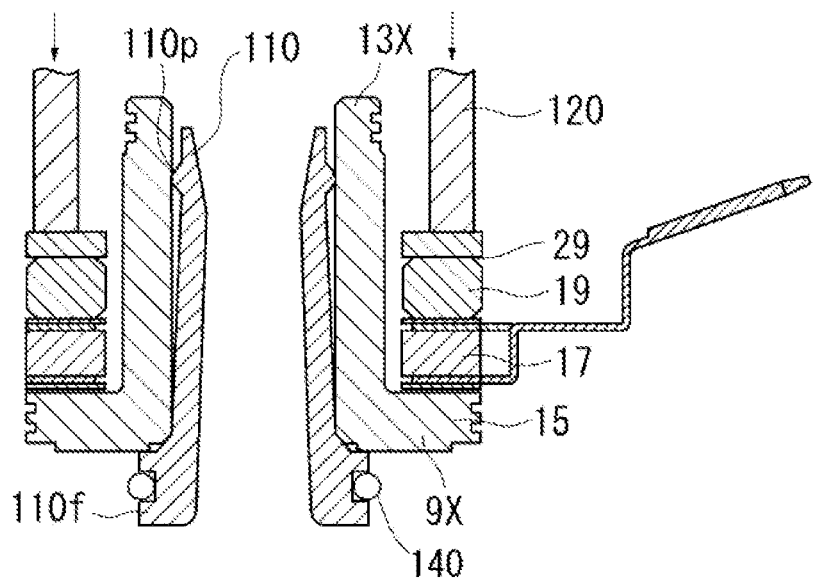

Subsequently, cylindrical pins 120 move down from above, and the disc spring 29 is pressed by the lower surfaces of the cylindrical pins 120, and plastically deformed so that an upper surface of the disc spring 29 becomes horizontal (FIG. 4B).

Figure 4C:
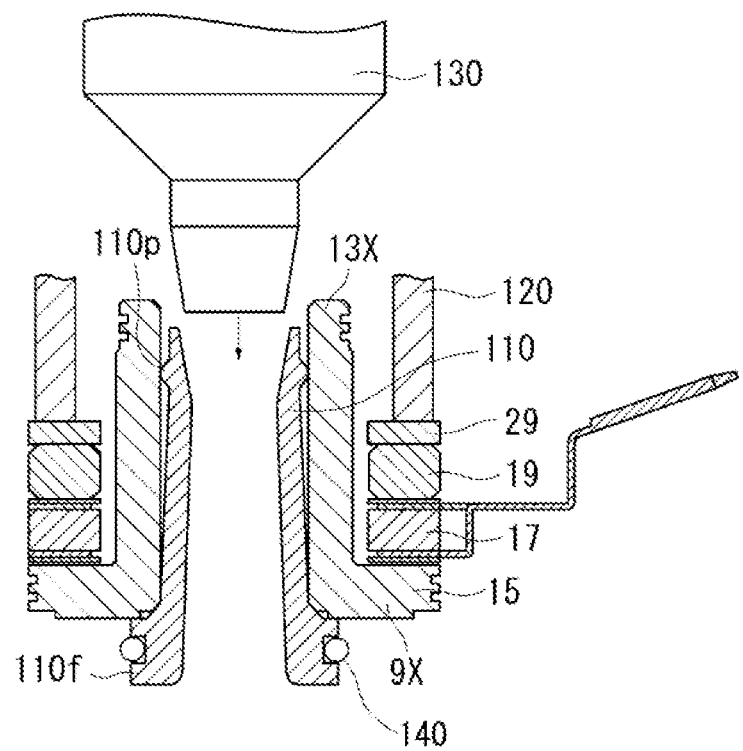
Figure 4D:
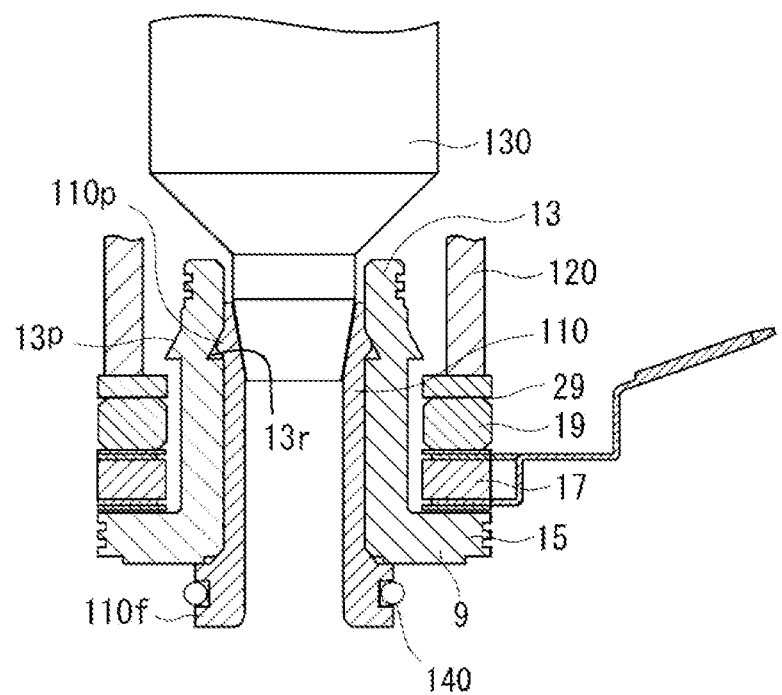

Then, in a state where the cylindrical pins 120 move down, the piston 130 is inserted into the upper end side (inner hole of the press jig 110) of the press jig 110 from above (FIG. 4C). The piston 130 is tapered to be narrowed toward a leading end thereof, and when the piston 130 is inserted into the press jig 110, the upper end side of the press jig 110 is pressed and widened, the respective pieces are moved outward in the circumferential direction, and the convex portion 110p is enlarged in diameter (FIG. 4D). For that reason, the inner surface of the cylindrical portion 13x which comes in contact with the convex portion 110p is plastically deformed and protruded outward in the circumferential direction to form the concave portion 13r. In this situation, since a position of the concave portion 13r (that is, a position of the convex portion 110p) is substantially the same as that of the upper surface of the pressed disc spring 29, the protruding portion 13p is formed on the upper surface side of the disc spring 29. Then, when the cylindrical pins 120 is separated, the disc spring 29 is elastically returned, and the upper surface 19a of the weight 19 is pressed toward the flange portion 15 side by an elastic force of the disc spring 29 while being kept in contact with the protruding portion 13p, and the above-mentioned laminate structure is fixed to the metal shell 9.

After the knocking sensor 1 has been assembled in this manner, the resin mold material (synthetic resin) is injected and solidified so as to cover the above-mentioned laminate structure including the metal shell 9, to thereby form the case 3 and complete the knocking sensor 1.

The present invention is not limited to the above embodiment, but encompasses a variety of deformations and equivalents included in the concept and scope of the present invention.

The insulating body may be made of a ceramic material in addition to the film-shaped synthetic resin described above, and may be coated with an insulating adhesive. In the above embodiment, the protruding portion 13p comes in contact with the upper surface 19a of the weight 19 through the disc spring 29 to lock the weight 19. This is because the insulating bodies 25 and 27 made of synthetic resin are thinned by thermal creep, and a gap is generated in the axial direction, and therefore the gap is filled by the plastic deformation of the disc spring 29. On the other hand, when the insulating body made of ceramic in which the thermal creep is not generated is used, the protruding portion 13p may be brought in direct contact with the upper surface 19a of the weight 19 to lock the weight 19, without the use of the disc spring 29.

Figure 6:
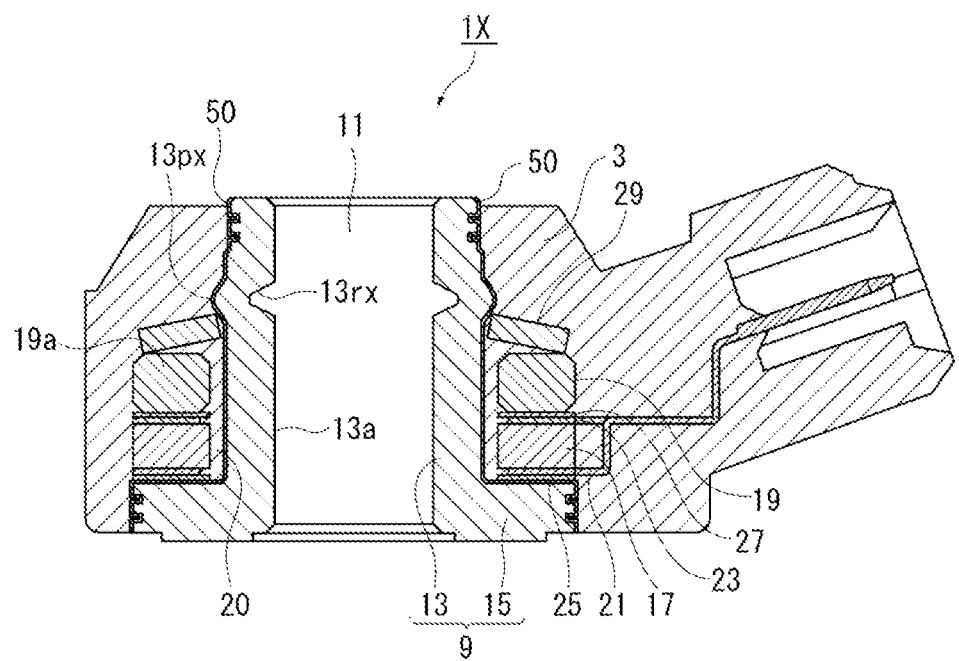
FIG. 6 is a cross-sectional view illustrating a modified example of a protruding portion.

The cross-sectional shape of the protruding portion may be configured as illustrated in FIG. 6. FIG. 6 is a cross-sectional view illustrating a modified example of the protruding portion, which is a cross-sectional view of the knocking sensor taken along the axial direction. In a knocking sensor 1X of FIG. 6, a shape of the cross-section of a protruding portion 13px is formed in a convex curved surface which is curved to be projected toward an outside thereof in a circumferential direction, and smoothly connected. A concave portion 13rx is formed in the inner surface 13a of the cylindrical portion 13 corresponding to the protruding portion 13px, and a depth of the concave portion 13rx in the circumferential direction is larger than the protrusion of the protruding portion 13px outward in the circumferential direction. The configuration in which the protruding portion 13px comes in contact with the upper surface of the disc spring 29 to press the disc spring 29 downward is identical with that in the case of FIG. 2.

In this way, when the shape of the cross-section of the protruding portion 13px is formed into the convex curved surface smoothly connected, no corner portion is formed in the protruding portion 13px. As a result, the resin mold material of which the case 3 is made surely flows onto the surface of the protruding portion 13px, and a throwing power of the resin to the protruding portion 13px is improved. When the plating layer 50 is disposed on the outer circumferential surface of the cylindrical portion 9, the corner portion is not generated in the protruding portion 13px, to thereby make it hard to peel off the plating layer 50 from the protruding portion 13px.

Figure 7:
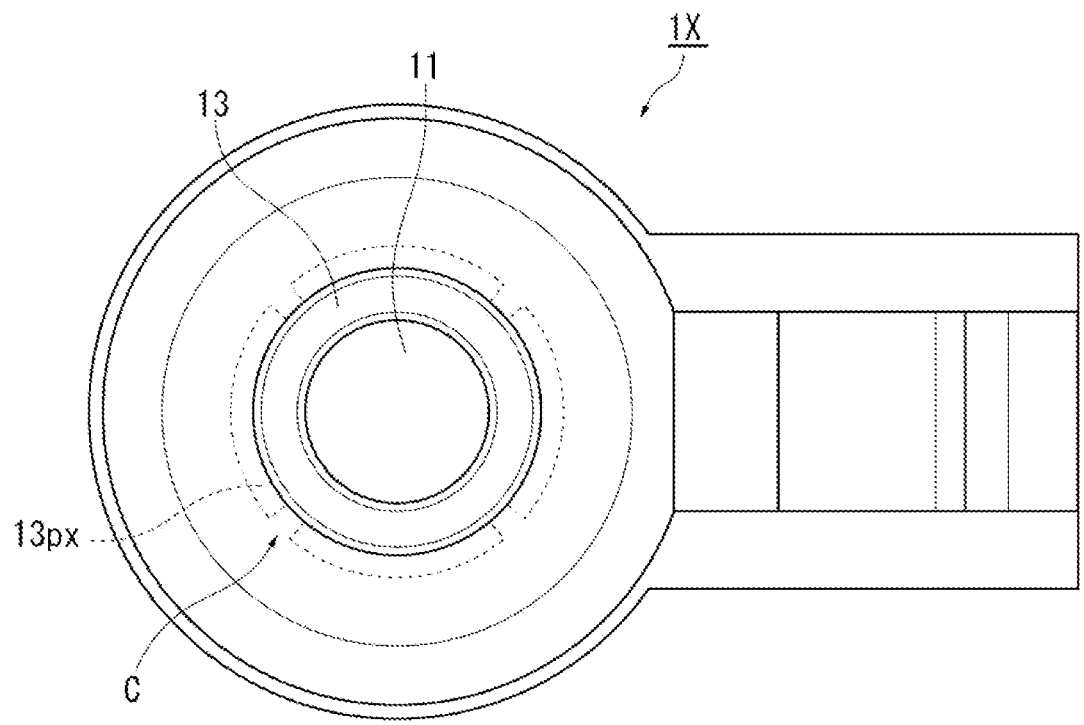
FIG. 7 is a top view of FIG. 6.

FIG. 7 illustrates a top view of the knocking sensor 1X in FIG. 6. The protruding portion 13px is divided into three or more (four in an example of FIG. 7) in the circumferential direction, and cuts C are formed between the respective protruding portions 13px in the circumferential direction.

In this way, when the cuts C are formed between the respective protruding portions 13px in the circumferential direction, the resin mold material of which the case 3 is made flows in the axial direction through the cuts C, to thereby improve the throwing power of the resin to the protruding portions 13px.

Figure 8:
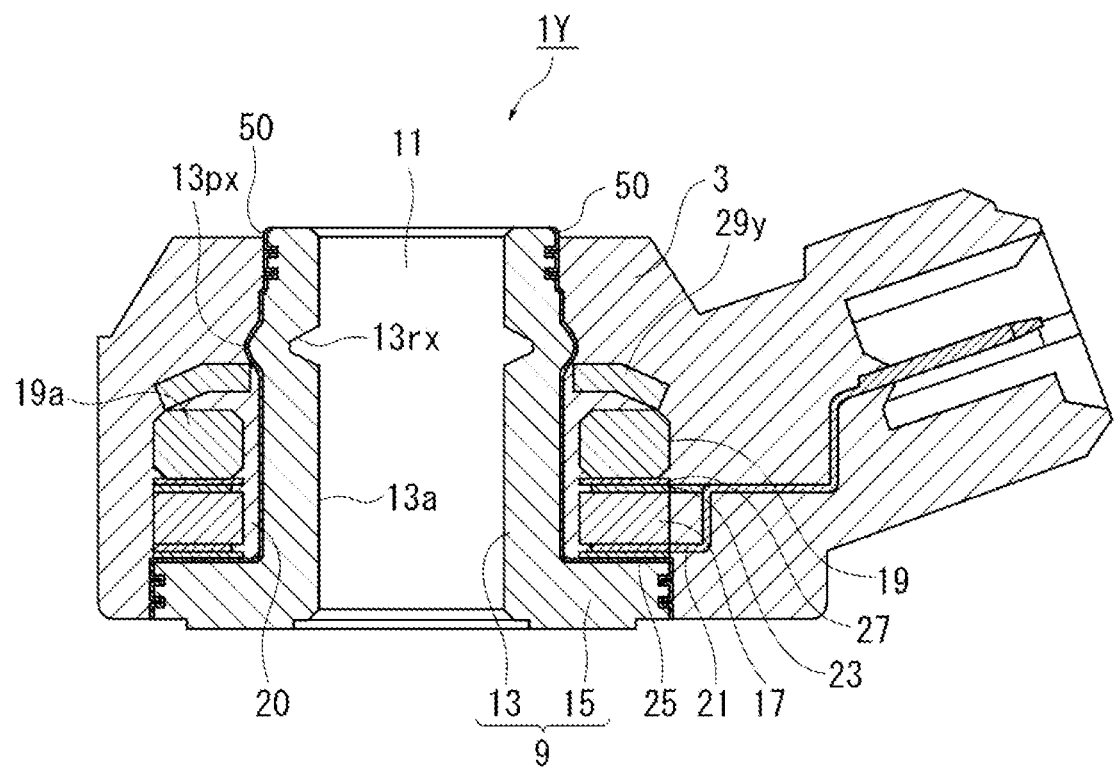
FIG. 8 is a cross-sectional view illustrating a modified example of a member.
Figure 9A:
FIGS. 9A and 9B are enlarged cross-sectional views illustrating a configuration of a member.

The annular disc spring 29 configuring the knocking sensor 1 according to the above embodiment may be replaced with an annular plate spring 29y illustrated in FIG. 8. FIG. 8 is a cross-sectional view illustrating a knocking sensor 1Y as a modified example using the plate spring 29y corresponding to "member" (a cross-sectional view of the knocking sensor taken along the axial direction). Then, as illustrated in FIG. 9A, the plate spring 29y includes a leg portion 29a of a circular truncated conical shape obliquely rising from the outer circumferential surface, and a horizontal portion 29b that extends horizontally from the leg portion 29a inward in the radial direction, and an inner circumferential surface 29c of the horizontal portion 29b is substantially in parallel to the axial direction of the plate spring 29y.

Figure 9B:
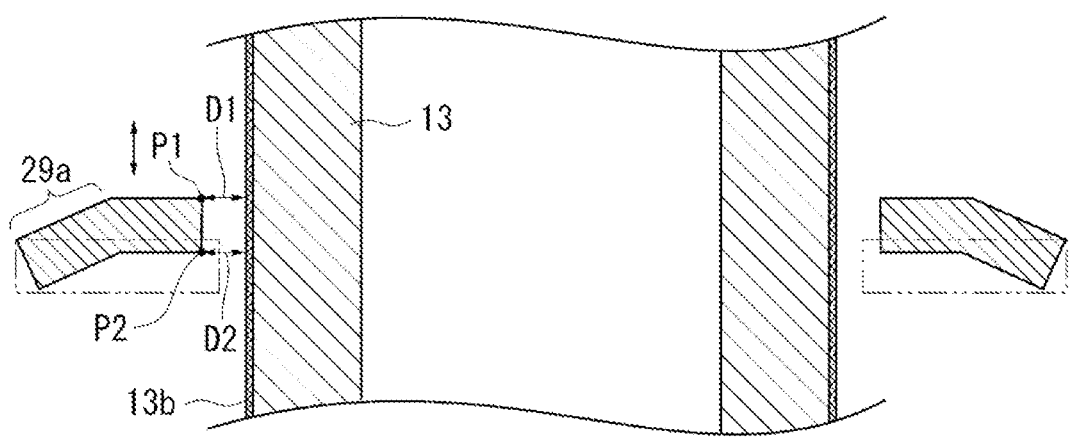

Then, the plate spring 29y is fitted onto the outer periphery of the cylindrical portion 13 of the metal shell 9, and when the plate spring 29y is pressed by the lower surface of the cylindrical pins (not shown) as in FIG. 4B, the leg portion 29a is bent and plastically deformed horizontally (FIG. 9B). Further, as in FIG. 4D, a protruding portion 13px (concave portion 13rx) is formed on a side of the cylindrical portion 13 which is located on the upper surface of the pressed plate spring 29y, and when the cylindrical pins are separated, the plate spring 29y is elastically returned, and the plate spring 29y is brought in contact with the protruding portion 13px. In this situation, since the inner circumferential surface 29c is substantially in parallel to the axial direction of the plate spring 29y (that is, also substantially in parallel to the outer circumferential surface 13b of the cylindrical portion), a corner portion P1 at the protruding portion 13px side and a corner portion P2 at the flange portion 15 side among the corner portion of the inner circumferential surface 29c of the plate spring 29y are at the same distances d1 and d2 from the outer circumferential surface 13b of the cylindrical portion, respectively. Then, because the corner portion P1 comes in contact with the protruding portion 13px, the corner portion P1 is made closer to the outer circumferential surface 13b of the cylindrical portion to reduce the amount of protrusion of the protruding portion 13px outward in the radial direction as much, and the plate spring 29y can be surely brought in contact with the protruding portion 13px.

The "outer circumferential surface 13b of the cylindrical portion" when defining the distances to the corner portions P1 and P2 mean a portion that is not plastically deformed except for the protruding portion 13px.

As described above, because the corner portion P1 comes in contact with the protruding portion 13px, it is possible that the plate spring 29y is arranged around the cylindrical portion 13 of the metal shell 9 so that the corner P1 is brought closer to the outer circumferential surface of the cylindrical portion than the corner portion P2, a relationship of the distances d1 and d2 satisfies d1>d2, and the plate spring 29y is surely brought in contact with the protruding portion 13px.

Figure 10:
FIG. 10 is a cross-sectional view illustrating another modified example of a member.

Further, as illustrated in FIG. 10, the above-mentioned plate spring 29y may be replaced with a generally-shaped plate spring 29z of a circular truncated conical shape obliquely rising from the outer circumferential surface without having the horizontal portion, and even if an inner circumferential surface 29d of the plate spring 29z is formed in parallel to the axial direction of the plate spring 29z, the same advantages as those of the plate spring 29y can be obtained.

What is claimed is:
1. A knocking sensor, comprising:
  a metal shell having a cylindrical portion, and a flange portion that is located on one end side of the cylindrical portion and projected toward an outside of the cylindrical portion in a circumferential direction;

an annular weight that is fitted onto an outer circumference of the cylindrical portion, and has an upper surface on an opposite side of a side facing the flange portion;

an annular piezoelectric element that is fitted onto the outer circumference of the cylindrical portion, and interposed between the flange portion and the weight; and an insulating body that is interposed between the flange portion and the piezoelectric element, wherein a protruding portion that is protruded while being plastically deformed from an inner circumferential surface of the cylindrical portion outward in a circumferential direction, and contacts the upper surface of the weight to lock the weight is disposed on an outer circumferential surface of the cylindrical portion, wherein a plating layer is disposed on the outer circumferential surface of the cylindrical portion.

2. The knocking sensor according to claim 1, wherein no thread portion is formed on the outer circumferential surface of the cylindrical portion.

3. The knocking sensor according to claim 1, wherein a shape of a cross-section of the protruding portion taken along an axial direction thereof is formed into a convex curved surface which is curved to be projected toward an outside thereof in a circumferential direction, and smoothly connected.

4. The knocking sensor according to claim 1, wherein the protruding portion is divided into three or more pieces in the circumferential direction thereof.

5. The knocking sensor according to claim 1, wherein the protruding portion directly contacts the upper surface of the weight.

6. The knocking sensor according to claim 1, wherein a member is interposed between the protruding portion and the upper surface of the weight.

7. The knocking sensor according to claim 6, wherein
the member is a disc spring,
a distance between a corner portion of an inner circumferential surface of the disc spring at a side of the protruding portion and the outer circumferential surface of the cylindrical portion is equal to or smaller than a distance between a corner portion of the inner circumferential surface of the disc spring at a side of the flange portion and the outer circumferential surface of the cylindrical portion.

8. The knocking sensor according to claim 1, wherein the protruding portion is formed at the outer circumferential surface of the cylindrical portion by pressing the inner circumferential surface of the cylindrical portion in such a manner that the inner circumferential surface of the cylindrical portion is plastically deformed in a radially outward direction.

9. The knocking sensor according to claim 1, wherein the plating layer comprises zinc.

10. The knocking sensor according to claim 1, wherein the plating layer comprises a chromate layer.

* * * * *